United States Patent Office 2,772,544
Patented Dec. 4, 1956

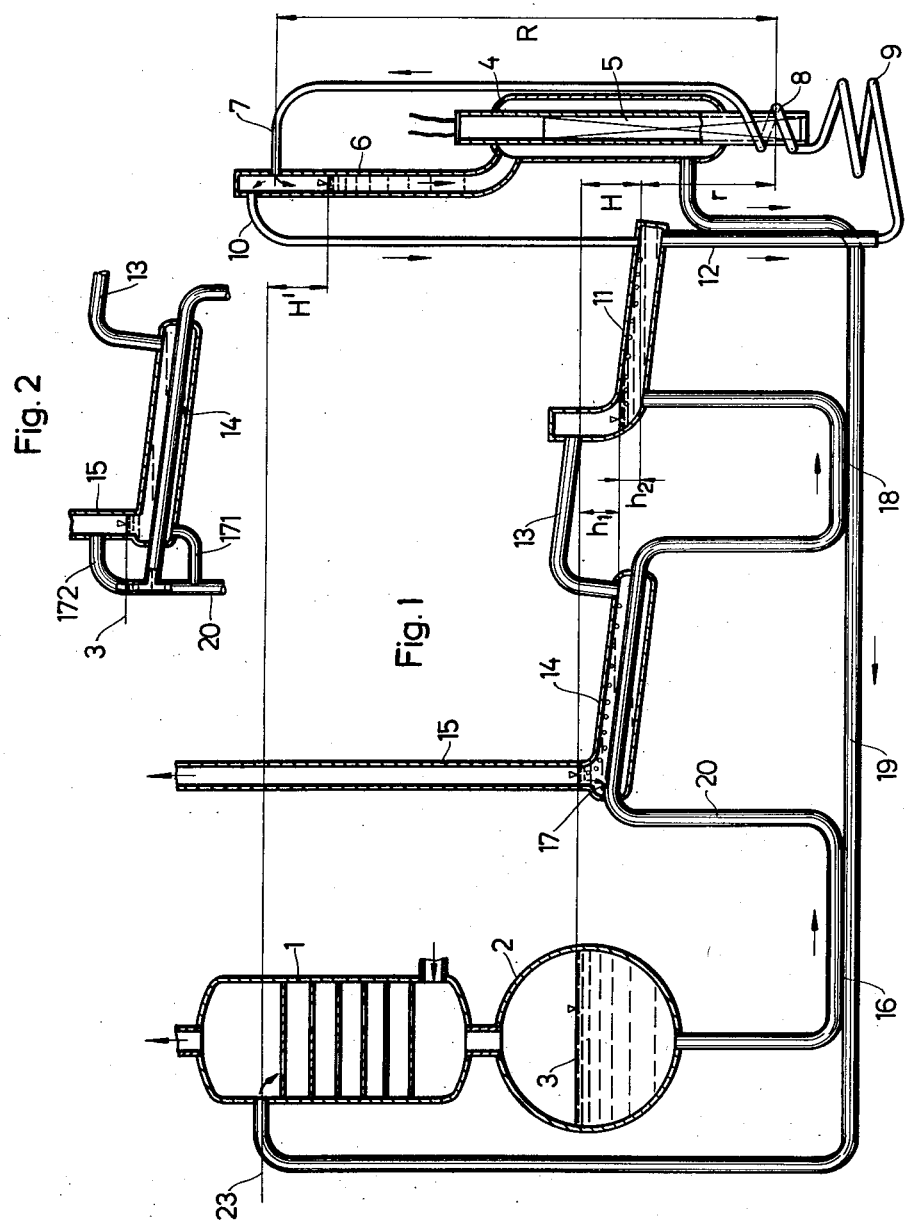

2,772,544

ABSORPTION REFRIGERATING APPARATUS EMPLOYING INERT GAS

Alvar Lenning, Stockholm, Sweden, assignor to Bolinders Fabriks Aktiebolag, Kallhall, Sweden, a corporation of Sweden Application November 16, 1953, Serial No. 392,379

Claims priority, application Sweden November 21, 1952

2 Claims. (Cl. 62—119.5)

The following invention relates to such refrigerating apparatus which operate with an inert gas and which are equipped with a single thermo-syphon for the circulation of adsorption liquid. The invention is confined to such apparatus wherein the hot vapours from the boiler proper are brought into direct contact with preheated rich refrigerant solution before being conveyed to the condenser.

In such apparatus—particularly when designed for being air cooled—which have to operate in high ambient temperatures the mean concentration of the refrigerant solution must be kept lower than usual in order to permit the absorber to perform properly. In expelling refrigerant (usually ammonia) from a comparatively weak solution and employing for this purpose a single stage boiler, rather large heat quantities are being lost in the rectifying process, owing to the high percentage of solvent vapour (usually water) in the vapour mixture being expelled from the boiler proper.

In the patent literature a large number of systems—aiming at conserving part of such heat losses—have been described. It is common practice to bring all, or part of, the hot vapour from the boiler into heat exchange with the preheated rich solution before its entry into the boiler. This may be accomplished in several ways. Owing to the fact that part of the hot vapours will condense in the course of such heat exchange certain provisions have to be made for the purpose of removing by gravity means the condensate thus being formed, unless a separate thermo-syphon is being resorted to for the condensate removal. A commonly used method to this effect comprises the step of causing the hot vapour to bubble through the preheated rich solution before conveying the vapour to the condenser. Several methods for heat conservation also include a second step: the partly cooled vapour is caused to deliver heat to the liquid heat exchanger interposed between the absorber and boiler, by being passed through a jacket surrounding the outermost heat exchange tube. In carrying out this so-called triple exchange method certain draining difficulties are bound to arise, since the liquid heat exchanger should preferably be inclining upwardly towards the boiler, lest vapour traps are likely to form in the rich liquid line. An interesting solution to this problem is embodied in the Swedish Patent 101,850 where, however, the solution storage vessel of the apparatus has had to be located on the boiler side, rather than on the absorber side, of the liquid heat exchanger. From the point of view of keeping the hot portions of the apparatus well insulated this is not entirely satisfactory. It is not satisfactory either to use—in a unit for domestic purpose—a triple heat exchanger since this is bound to be rather bulky for this type of application.

The present invention simultaneously solves the problem of draining off condensate from the hot vapour conduits for heat conservation, of obviating vapour traps from forming in the liquid heat exchanger and vapour conduits and also of obviating the use of a triple heat exchanger, while maintaining the liquid storage vessel where it belongs, i. e. at the relatively cold absorber end of the liquid heat exchanger. The main features of the invention comprises: (1) conveying hot vapours from the boiler analyzer in direct contact and heat exchange with preheated rich solution coming from the absorber (as in several known apparatus); (2) conveying the vapour (thus partly cooled off) through a second vessel and in direct contact and heat exchange with condensate formed by the vapour itself, said condensate being in turn cooled off by a branched-off loop conduit, forming part of the liquid heat exchanger and carrying rich liquid from the absorber towards the boiler. Other novel features will be apparent from the following specification.

The invention will be more explicitly described in conjunction with the accompanying drawing in which Fig. 1 represents the boiler and adsorber portions of an apparatus according to the invention. Fig. 2 shows a modification of a certain part of the apparatus illustrated in Fig. 1. Both of the figures have, for the sake of clarity, been rather diagrammatically drawn. In the actual apparatus the hot portions of the system should be coiled up to a more compact structure which lends itself to be insulated within a single, plain casing. The liquid heat exchanger portions designated by 16 and 18 should in a practical embodiment be sloping upwardly towards the right, i. e. towards the boiler.

In Fig. 1 reference number 1 designates an absorber (preferably air cooled), 2 is a storage vessel for rich solution from the absorber, the free liquid level in which bears numeral 3. The apparatus is being operated by means of a boiler 4 which is heated by an electric cartridge 5. This cartridge may be inserted into the boiler central tube from above if so desired. A vapour riser 6 from the boiler contains perforated baffles (only indicated) and thus constitutes a type of analyzer. A thermo-syphon riser 7 emerges into the top portion of riser 6. A coil portion of the same thermo-syphon is designated by 8; it is connected in series with a coil shaped damping conduit 9. From the upper portion of the riser 6 a vapour conduit 10 leads downwardly into a wider conduit 11 which gently slopes upwardly from the boiler; it serves as a second analyzer. The vapour passes from the vapour separating space of conduit 11 through conduit 13 into a similarly sloping tube or vessel 14 which contains vapour condensate, and thence into a vapour riser 15 to the unit condenser or final rectifier (not shown).

Rich solution from the storage vessel 2 on its way to the thermo-syphon coil 8 passes the liquid heat exchanger section 16, then a branched off loop conduit 20—which is in heat exchange relation with vessel 14—then a second liquid heat exchanger section 18, and subsequently the analyzing vessel 11. From the boiler end of vessel 11 a dropping conduit leads to the aforementioned damping tube 9. Poor liquid from the boiler flows towards the absorber through conduit 19 which forms part of the liquid heat exchanger portions 18 and 16, and emerges into the absorber at 23. In Fig. 1 this conduit is shown in heat exchange relation (at 12) with the dropping conduit supplying semi-rich liquid to the thermo-syphon.

Fig. 2 shows an alternative arrangement of certain parts in Fig. 1, specifically the heat exchanger 14 with its draining means. The aperture 17 in Fig. 1 has in Fig. 2 been replaced by a vent pipe 172 which enters riser 15 above the liquid level 3, and by a liquid drain 171 for the removal of such condensate as would otherwise accumulate in tube 14.

The system now having been described works as follows. Vapour entering tube 13 from the second analyzer 11 still contains an excessive amount of water which has to be liquefied and removed before letting the remaining vapour enter the condenser. A large portion of this liquefaction takes place in the vessel 14 by indirect heat exchange with rich and only slightly preheated liquid coming from the absorber via the heat exchanger section 16. This section may be made rather small and even be entirely dispensed with. That condensate which is thus formed in vessel 14 and to which is added condensate from the riser tube 15 is continuously being drained off into the rich liquid via aperture 17 (respectively via conduit 171 in Fig. 2), its level in the riser tube being determined by the liquid level 3 in the storage vessel 2. The arrangement according to Fig. 2 constitutes the preferred embodiment, since it effectively prevents rich solution from the absorber to enter vessel 14 where it—at the prevailing temperature—would absorb unduly large quantities of ammonia. It should be apparent that the function of the condensate in vessel 14 is to provide an effective means of transferring heat from the hot vapour to the rich solution without mixing the two agents; this heat transfer is being facilitated by letting the hot vapour bubble through its own condensate.

From Fig. 1 it will be apparent that the total liquid column H, to be bubbled through by the boiler vapour, is composed of two individual columns $h_2$ and $h_1$. Column $h_2$ comprises the pressure head exerted by the liquid in the second analyzer 11, and column $h_1$ by the condensate in vessel 14. In the boiler riser 6 there will take place a corresponding depression H′, of the liquid level as measured from the level determined by the absorber inlet at 23. Disregarding differences in specific gravity and flow resistance heads it will be apparent that H will equal H′. In Fig. 1 the thermo-syphon elevation column, as measured from the center of the thermo-syphon coil, is designated by R, and the effective thermo-syphon driving column by $r$. Usual values for the ratio $r:R$ are .25 to .35.

In the example shown in Fig. 1 vessel 14 surrounds tube 20 as a jacket. In actual practice the heat exchange between these tubes may, alternatively, be accomplished by welding conduit 20 to vessel 14, preferably on its bottom side.

Without departing from the inventional idea the economy of operation may be further enhanced by employing several exchangers, similar to 14, in series, each being provided with a branched-off loop, similar to 20, from the liquid heat exchanger.

What I claim is:

1. In absorption refrigerating apparatus operating with inert gas and comprising a boiler, a thermo-syphon for elevating absorption liquid into the boiler, an absorber, a conduit for weak solution leading from said boiler to said absorber, and an analyzer in which hot vapour from the boiler is brought into direct contact with rich solution, that improvement which consists in conveying hot vapour from said analyzer into a separate vessel in which the vapour gives off condensate in the process of being cooled by rich liquid, through the intermediary of said condensate, the cooling rich solution being then conducted to the analyzer through a conduit which is in heat exchanging relation to said conduit for the weak solution.

2. An absorption refrigerating apparatus operating with inert gas and comprising a boiler, a thermo-syphon for elevating rich solution into the boiler, an absorber having a storage vessel associated therewith, a conduit for weak solution leading from said boiler to said absorber, and an analyzer in which hot vapour from the boiler is brought into direct contact with rich solution conducted to the analyzer through a conduit from said storage vessel, hot vapour being conveyed from the analyzer into a separate vessel in which said hot vapour gives off condensate in being cooled by the rich solution conduit, the said conduit for rich solution being in heat exchanging contact with said conduit for weak solution in the space between said analyzer and said separate vessel.

References Cited in the file of this patent

UNITED STATES PATENTS

| | | |
|---|---|---|
| 2,134,149 | Schellens | Oct. 25, 1938 |
| 2,215,674 | Ullstrand | Sept. 24, 1940 |
| 2,238,138 | Taylor | Apr. 15, 1941 |
| 2,302,091 | Anderson | Nov. 17, 1942 |
| 2,357,612 | Soroka | Sept. 5, 1944 |
| 2,504,784 | Ashby | Apr. 18, 1950 |